Patented Nov. 7, 1950

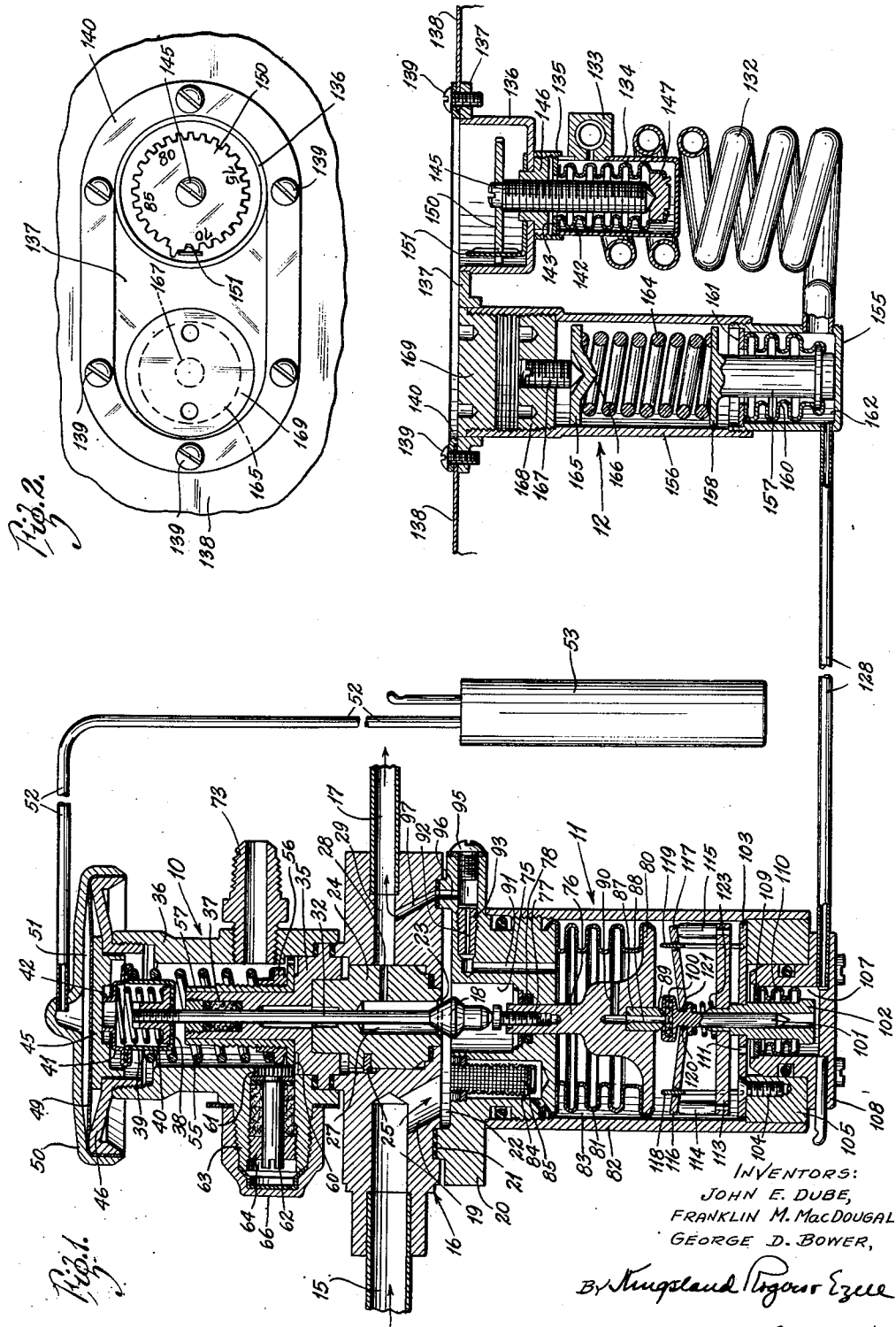

2,529,378

UNITED STATES PATENT OFFICE 2,529,378

THERMOSTATIC VALVE WITH MULTIPLE OVERRIDE

John E. Dube, Chesterfield, Franklin M. MacDougall, Kirkwood, and George D. Bower, University City, Mo., assignors to Alco Valve Company, University City, Mo., a corporation of Missouri Application June 9, 1945, Serial No. 598,494

17 Claims. (Cl. 236—92)

1

The present invention relates to a thermostatic valve with multiple override, and more particularly to a thermostatic valve with an override operated in response to existence of either an extreme temperature condition or an extreme pressure condition.

It is an object of the invention to provide a single automatic control, wherein all of the necessary automatic controls, except the compressor capacity control, are incorporated in one unit.

It is a further object to provide a valve of this class which provides the conventional thermal valve control, as used in refrigeration, plus control of the limits of condensing pressure to a predetermined maximum value, and control of the limits of the temperature of the refrigerated medium, such as the air, to a predetermined minimum value. It is a further object to provide such control wherein the pressure response is from the valve inlet pressure and the temperature response is through a separate bulb and tubing, such as capillary tubing.

From the foregoing, it may be stated to be a broad object of this invention to provide a refrigeration control that will effect loading of the evaporator to the maximum capacity during normal operating conditions, but which, in the event of sustained overload that would overheat the compressor motor, will limit the load in response to the result in increasing condensing pressure, together with means that will prevent the temperature of the refrigerated medium from dropping below a predetermined value. It is a further object to provide the foregoing wherein the limiting of the minimum temperature is effected by starving the evaporator, which, in turn, decreases the evaporating temperature, thereby reducing the total heat transfer but increasing the ratio of latent to sensible heat transfer. As a result, it may be stated as an object of the invention to provide a control that keeps the system in continuous operation through the entire load range, providing maximum capacity under heavy demand and maximum dehumidification under light demand.

It is a more specific object of the invention to provide a primary control for the refrigerant, with an override unit using refrigerant for its energy source to effect an overriding control of the main valve regardless of the conditions demanded by its primary control means. It is a particular object to provide the override in the form of a pilot valve that will modulate the override condition in response to the temperature and

2 pressure conditions which it is desired to use as control factors.

It is a further object to provide a dual override device on a valve, which override device is responsive to limits of pressure and temperature without interference of the pressure and temperature means by each other. Further, it is an object to provide dual override control of this kind, operating on a single valve, that is effective despite variation in the range of temperatures or pressures to which it is subjected. A further object is to provide such a control with adjustments of the critical values of temperature and pressure, especially where the adjustments are accessible to remote control.

A particular object is to provide such a control wherein the power for operating the main cut-off is obtained from a first power means operated by line pressures, and separate from a second control power means that is directly responsive to the temperature and pressure conditions, with an arrangement whereby the first power means always maintains an operating relationship to the second despite variations in the range of line pressures.

Further objects will appear from the description to follow.

In the drawings:

Fig. 1 is a transverse section through the main valve, the pilot valve, and the remote control; and Fig. 2 is a top plan view of the remote control, showing the means whereby it may be adjusted.

Broadly speaking, the control consists of a first valve operating means 10, which is here shown as substantially a conventional constant superheat thermal valve, together with an override control 11, which is mounted together with the thermal valve control. There is also a third element in the form of a remote control mechanism 12.

Assuming the device to be used in connection with a refrigeration control, there is an inlet 15 coming from the condenser or some like part of the refrigeration system. This inlet passes into a valve housing generally indicated at 16, from which an outlet 17 is provided to lead to the evaporator.

The mechanism centers around a valve 18 that controls the flow between the inlet 15 and the outlet 17. The valve housing 16 is provided with an angular port 19 that leads downwardly to the bottom of the main housing. This bottom is closed by a lower cover plate 20 seated by a flange 21 onto the main housing 16, whereby to provide a space 22 in the form of a valve inlet chamber leading from the passage 19 to adjacent the valve 18.

The valve is adapted to cooperate with a valve seat 23 disposed in an insert 24, fitted into a suitable opening within the main valve housing 16. The insert 24 is provided with a key 25 engageable within a slot in the main housing 16 to prevent rotation of the insert.

The insert has a bore 27 extending vertically up from the valve seat 23. This bore has a transverse outlet passage 28 that registers with another passage 29 within the housing 16, into which the main evaporator outlet 17 is fitted.

The valve 18 is formed with a valve stem 32 that extends up through a continuation of the bore 27 within the insert 24.

Above the insert 24, there is a valve rod and compression spring support 35, having a cut-out in its lower surface to receive and to hold the top of the insert 24 as shown. This member 35 is also flanged to fit over a ridge on the top of the main valve housing 16. The member 35, in turn, is clamped onto the main valve housing 16 by a thermal unit casing 36 which fits over the flange on the member 35 and down to the flange on the housing 16. Suitable bolts are used to hold these three parts together, and they, in turn, clamp the insert 24 into place.

It will be seen that the valve stem 32 projects upwardly through the support 35, where it passes through a packing gland 37. The upper end of the valve stem is threaded and receives a flanged nut 38 disposed within a cup-shaped spring holding member 39. A coil spring 40 is disposed within the holding member 39 and acts downwardly upon the flange of the cap 38. At its upper end, the coil spring 40 acts against a cap 41, the edges of which are turned over the flanges of the cup 39 to secure these parts together. The cap 41 has an upstanding cylindrical flange 42 through the top thereof. The opening in the flange gives access to the top of the nut 38 which is provided with a slot to receive an adjusting tool, and the flange forms an abutment means, as will appear.

The flange 42 is disposed to abut the lower side of a buffer plate 45. This buffer plate is in the form of a skirted cylindrical disc cooperable with a supporting member 46. The latter is also in the form of a somewhat sloping disc with an internal cylindrical skirt threaded to be screwed into a corresponding internally threaded opening in the upper part of the casing 36, and an external diaphragm receiving skirt. The internal skirt of the buffer plate interfits that of the lower diaphragm support 46, for guided vertical reciprocation, the lower limit of which is fixed by the engagement of the buffer plate against the support.

A diaphragm 49 extends across the upper face of the buffer plate 45 and is turned down around the outer skirt of the lower diaphragm holding member 46. It is sealed and held in position by a cap member 50, having a depending outer flange which is permanently secured in sealing relationship to the edge of the diaphragm. The cap member 50 is shaped to provide, above the diaphragm, a pressure chamber 51. A capillary tube 52 leads into this pressure chamber, and, at its other end, is connected with a thermal bulb 53 adapted to contain a volatile fluid.

The flange on the cup member 39 associated with the top of the valve stem 32 is adapted to receive the upper end of a superheat coil spring 55, the lower end of which abuts against the flange on a flanged, adjustable nut 56 which is threaded about the external threads of a sleeve member 57. This sleeve member is slipped around the upstanding cylindrical part of the support 35, and at its bottom rests upon the lower enlarged part of the support 35. The lower part of the sleeve 57 has a gear 60 integral therewith, and intermeshed with a pinion 61 provided on the inner end of a rotatable adjusting shaft 62. This adjusting shaft passes through suitable packing and is supported in a bored projection 63 extending outwardly from the thermal casing 36. A plug 64 is externally threaded to fit into internal threads in the bore of the projection 63, whereby this plug holds the packing in proper place and provides a bearing for the outer end of the shaft 62. The shaft projects through the plug and is slotted at its outer end to receive an adjusting tool. A cap 66 is threaded onto the projection 63 to protect the mechanism from dust and from inadvertent displacement, and to prevent escape of any gas that may pass the packing.

The thermal casing 36 has a fitting 73 extending therefrom for connection into the evaporator at some point. The lower housing cover member 20 is provided with a well 75, cut in from the top thereof and forming a part of the valve inlet chamber, into which the head 18 of the valve extends. Projecting up through the bottom of this well 75 is a stem 76 that is formed as part of a bellows head, as will be shown. This stem has an adjustable abutment screw 77 on its upper end that is adapted to abut and operate the valve 18 under certain conditions. Suitable packing 78 is provided for this stem 76.

The stem 76 is a part of a bellows head 80, an operating bellows 81 being secured at its bottom end to this bellows head 80. The upper end of the bellows 81 is sealed to the lower surface of an externally threaded projection on the bottom of the member 20.

This threaded projection receives a bellows casing 82 that depends downwardly therefrom, and, with closure means to be described, provides an outer pressure chamber 83 surrounding the bellows 81. The lower housing cover 20 is also provided with a downwardly extending port 84, having a strainer 85 therein, this port communicating with the outer bellows chamber 83. The bellows head 80 is provided with an insert 87 having a constricted port 88 therethrough that terminates at its outer end in a valve seat 89. At its inner end, the port registers with a transverse port 90 that leads to the interior of the bellows. There is an outlet for the interior of the bellows in the form of a port 91 that passes through the upper bellows head formed as part of the lower cover member 20, and leads to a constricted port 92 in an insert 93. This insert 93 is screwed by a kerf on its outer end into an internally threaded hole extending inwardly from the side of the lower cover 20. The outer end of this hole is closed by a removable screw 95. Between the outer end of the insert 93 and the inner end of the screw 95, a vertical passage 96 leads to a passage 97 in the main body member 16 that communicates with the outlet passage 29 thereof.

The bellows is adapted to be operated in response to differences in internal and external pressures acting thereon. These pressures are regulated by a valve 100 coacting with the valve seat 89 to control the flow of fluid from the inlet through the bellows to the outlet. The valve 100 is mounted upon a valve stem 101 slidable in a vertically disposed sleeve 102. This sleeve, in turn, is slidable through an opening in a fixed disc 103, the sleeve 102 having a shoulder to limit its upward movement with respect to this disc. The disc 103 is held by screws 104 to a ring 105 that is permanently united to the interior of the end of the bellows casing 82.

The sleeve 102 below the fixed disc 103 fits within a cylindrical well 107 in a closure cap 108 interfitting into and attached to the ring 105. A sealing washer 109 is secured across the top of the well 107 and loosely surrounds the sleeve 102. It forms an upper head for a pilot bellows 110, to which it is secured. The other end of the pilot bellows is sealed to the end of the sleeve 102. Thus the well 107 forms an outer pressure chamber for the bellows 110. The interior of the pilot bellows communicates through the washer 109 and a port 111 in the fixed disc 103 to the outer chamber 83 of the operating bellows 81.

The sleeve 102 also carries, at its upper end above the fixed disc 103, a cross head 113 having two oppositely disposed outstanding posts 114 and 115 thereon. These posts engage the outer ends of a pair of lever arms 116 and 117 that are pivoted onto standards 118 and 119. The two standards are fixed at their lower ends into the fixed disc 103, whereby they do not move with movement of the cross head 113. The inner ends of the two levers 116 and 117 engage within notches 120 and 121 on the valve stem 101, whereby they may rock in the notches but not be displaced therefrom. It may be predicted that up and down movement of the cross head 113, caused by vertical movement of the sleeve 102, will rock the two levers 116 and 117 about their connection with the posts 118 and 119, so as to operate the valve stem 101 vertically. A coil spring 123 surrounds the valve stem 101 and is compressed between the lower flange forming the notches 120 and 121 and the cross head. This spring urges the valve 100 up and the cross head down, and thereby keeps the valve in positions determined by the cross head and the pins 114 and 115.

A capillary or like tube 128 is secured into the head 108 and opens into the well 107 at the outside of the pilot bellows 110. This capillary leads to the remote control mechanism 12, which may be located wherever convenient.

The remote control mechanism 12 includes a thermostat bulb 132 in the form of a coil. One end of this coil is connected by a fitting 133 into a cup 134. This cup is supported by an internally threaded ring 135 that is united to a cup member 136, the upper end of which is attached permanently to a dial ring 137. The dial ring is secured to some suitable support 138 which may be part of an air duct conveying return air to the evaporator coils. The attachment is made by screws 139, which also attach a bezel ring 140 above the dial ring.

Within the cup 134, a bellows 142 is disposed. It is attached at its upper end to a washer 143 which is sealed at its outer edges to the cup 134. A plug 146 is threaded into the ring 135 and projects upwardly through the bottom of the cup 136. The plug has an internally threaded bore through it which receives an adjusting screw 145 that bears against a lower bellows head 147 that is sealed to the lower end of the bellows 142. The upper end of the screw 145 receives an adjusting wheel 150 which has teeth around its periphery to engage with a detent 151 that is attached about the projection of the plug 146 through the cup 136. The wheel 150 preferably carries graduations. It will be seen that the rotation of the screw 145 adjusts the displacement effected by the bellows 142.

The other end of the bulb 132 opens into a cup 155, into which the capillary tube 128 is also connected. The cup 155 forms part of a pressure-responsive displacement chamber. It is supported on a cylindrical spring casing 156 that is inserted into and secured with the plate 138.

A pressure head 157 projects down into the cup 155 and also, at its upper end, projects above the cup where it has a spring abutment head element 158. The lower end of the head 157 is united in sealing relationship with the lower end of a bellows 160. The upper end of this bellows is sealed to a washer 161 that surrounds the member 157 but is not in contact therewith. By this means, the cup 155 provides a fluid receiving chamber 162 outside the bellows 160, and the interior of the bellows is in communication with the spring casing 156.

The spring casing 156 encloses a coil spring 164 that abuts at its lower end upon the head 158 of the stud 157. The upper end of this spring is compressed against a disc 165 that has a conical depression 166 in the center thereof to engage and automatically center with the point on an adjusting screw 167. The adjusting screw is threaded into a removable head 168 that is externally threaded to be inserted into the upper end of the casing 156, which is provided with a shoulder to limit the downward movement of the head 168. It will be seen that this head has tool receiving indentations whereby it may be inserted, adjusted or removed.

As it is normally desirable to prevent change of the setting of this plug 168, it is covered by a second plug 169 threaded also into the top of the spring casing 156. The spring 164, by the foregoing construction, exerts a downward force upon the bellows. The casing 134, the coil 132, the well 162, the tube 128 and the outer chamber of the pilot bellows 110 are all completely filled with a liquid that does not vaporize at the normal temperatures of operation.

At the time of the assembly of the unit 12, the plug 168 is screwed all the way down against its stop. Then the screw 167 is screwed down until a spring load equal to the maximum setting desired is obtained. Then the screw 167 is locked to the plug 168 by soldering or other means. Thereafter, temperature adjustment is obtained by rotating the plug 168 to provide pressure cut-off points lower than the maximum for which the unit is set.

*Operation*

The operation of the device is as follows:

First, it will be assumed that the mechanism is operating in accordance with conventional constant superheat thermal valve conditions in a refrigeration system. Under such circumstances, the bulb 53 will normally be located to respond to temperatures at the outlet of the evaporator. The outlet 73 leading into the thermal housing 36 will be connected to some point in the outlet pressure line to which the thermal valve is to respond. Under these connections, the diaphragm 49 will be acted on above by the vapor pressure produced from the bulb 53 in response to evaporator outlet temperature. This gas pressure will be opposed by the force of the coil spring 55 acting below the diaphragm, and also by the gas pressure introduced through the external equalizer inlet 73. As a result, the diaphragm 49 will be positioned in response to predetermined superheat and will regulate the position of the main valve 18 to maintain a constant degree of superheat in the evaporator outlet.

The upper cup assembly 39 is maintained against the buffer plate 45, which, in turn, is maintained against the lower surface of the diaphragm 49 by the coil spring 55. Hence the cup assembly 39 travels with the diaphragm. Its downward movements are transmitted through the internal coil spring 40 to the flanged nut 38 which is attached to the valve stem 32. Hence, in the absence of some upward force on the valve stem exceeding the force of the coil spring 40, the valve stem and the valve 18 will move directly with movements of the diaphragm. Upward movement of the diaphragm will always be accompanied by movements of the valve, because the cup member bears directly on the flange 38 of the nut attached to the upper end of the valve stem 32.

The liquid refrigerant enters through the inlet 15 and passes by the passage 19 to the inlet valve chamber 22. Thence it flows past the valve 18 which usually is employed as an expansion valve, into the chamber 27 on the outlet side of the valve. The refrigerant, under reduced pressure, flows from that chamber through the port 28, the passage 29, into the evaporator line 17. The amount of refrigerant thus permitted to flow is determined by the valve 18 which is positioned by the diaphragm 49, so that the refrigerant will maintain constant superheat in the evaporator.

This superheat value, at which the valve operates, may be adjusted by adjusting the force exerted by the coil spring 55. This is accomplished by rotating the adjusting screw 62, and thereby rotating its gear 61 which meshes with the teeth 60 on the sleeve 57. The outer nut 56 is non-rotatably mounted within the casing 36, so that the rotation of the sleeve moves the nut 56 up or down, as the case may be, to vary the initial compression of the spring 55, and hence to vary its forces.

The overriding control 11 is designed to maintain the pressure of the refrigerant entering the control within maximum limits, and to maintain the temperature produced by the system within minimum limits.

It will be seen that the operating bellows 81 is always subjected, on its outside, to inlet pressure, and is always subjected, on its interior, to outlet pressure. Inlet pressure always acts on the interior of the pilot bellows 110. The exterior of the pilot bellows is always subjected to the liquid pressure in the thermal unit system.

The operating bellows 81 is positioned as a function of the internal and external pressures acting on it. The external pressure tends to contract it against the internal pressure, which, with the inherent spring effect of the bellows, tends to expand it. If the pilot valve 100 be assumed as closed, and the main valve 18 be opened, then the force of the inlet pressure will compress the bellows. This opens the pilot valve by withdrawal of the pilot valve seat 89, and admits inlet pressure through the constriction 88 into the bellows. There is a pressure drop through the constriction 88, and a further drop through the outlet constriction 92. The resulting intermediate pressure determines the position of the bellows. When the pilot valve opens, flow into the bellows builds up the intermediate pressure, causing the bellows to expand again. However, the expansion causes the pilot valve seat to approach the valve 100 again, throttling the flow through the constriction 88, and reducing interior pressure. The bellows will find a position of equilibrium with respect to the valve 100 wherein expanding and contracting forces are equal. This position occurs where inflow and outflow are equal.

The equilibrium position of the bellows is always one that keeps the pilot valve seat 89 very close to the pilot valve 100, regardless of the particular inlet and outlet pressures across the main valve 18, and regardless of the position of the main valve, between extremes of movements permitted the several parts. This results from the fact that the pilot valve merely regulates the ratio between flow into the bellows 81 through the constriction 88 and the flow from the bellows through the outlet constriction 92. This fact that the seat 89 remains near to the valve 100 is employed as a means to effect operations in response to movements of the valve.

The arrangement also insures ample power through a substantial range of distance, for the operation of the overriding cut-off to close the main valve 18. This power is derived from the refrigerant itself.

Since, in operation, the operating bellows 81 will remain near to the pilot valve 100 to maintain equilibrium, relatively small movements of that valve will cause movement of the bellows. The pilot valve is operated by the pilot bellows 110, which is subjected on one side to the inlet refrigerant pressure, and on the other to the pressure of the liquid filling the thermal system. As this liquid is nonvolatile within the operating range, it is non-compressible, and variations in inlet pressure will not affect it.

During normal operation, the medium being refrigerated, such as air, will remain above a predetermined minimum temperature adjacent the coils. Should this air temperature decrease below such value, the system would be acting at an excessive productive rate.

As the temperature around the coil 132 approaches this predetermined minimum, the thermal liquid will be reduced in volume proportionately, and the liquid pilot bellows 110 will be expanded, lowering the sleeve 102 within the chamber 107. This will lower the cross head 113 and its pins 114 and 115, permitting the inner ends of the two levers 116 and 117 to move upwardly, with the valve 100, under the influence of the coil spring 123.

When the pilot valve 100 moves upwardly, it approaches the seat 89, throttling gas flow therethrough. This decreases the pressure within the bellows, which thereupon contracts until equilibrium is restored. As the temperature at the bulb 132 continues to drop, the pilot valve 100 continues to rise, and the bellows collapses further. After a predetermined amount of upward movement of the bellows, the screw 77 will contact the valve 18, and begin to throttle it. The main valve 18 is moved upward despite the expanded condition of the diaphragm 49 by compressing the coil spring 40 within the cup 39. The power required will increase after contact between the screw 77 and the valve, but will be made available by automatic adjustment of the pressure drop across the pilot valve to increase the pressure difference on the operating bellows 81, as will be understood. The pilot valve mechanism is not required to develop high power. All of the power derives from the refrigerant itself.

Should the starving of the evaporator, by throttling of the valve 18, not produce a cessation of the reduction of air temperature, the latter will finally reach a minimum value. At this point, the bellows 110 will expand to such a degree that the operating bellows 81 closes the main valve 18, until the air temperature rises.

If at any time the refrigerant inlet pressure should rise above a desired maximum, its force applied within the pilot bellows 110 will force the incompressible thermal liquid back out of the well 107, into the casing 155, to collapse the bellows 160 against the spring 164. The actual maximum pressure is a function of the force of this spring. This force may be adjusted by the plug 168.

The effect of the expulsion of liquid from the pilot well 107 is to cause expansion of that bellows and drive the pilot valve upward, closing the main valve.

The excess inlet pressure may be a result of excessive demand on the evaporator, sustained overload, or it may be an incident to starting the system against a relatively hot evaporator having high back pressure. In any case, it is controlled by the foregoing means.

The temperature at which the override will close the main valve is determined by the setting of the disc 150, which is graduated to cooperate with the detent 151 as an index. Downward adjustment of the screw expands the bellows 142, expelling more liquid into the coil, and ultimately into the well 107, for any given temperature.

It will be seen that the temperature and pressure overrides are, for all practical purposes, separately operable, though using the same control and acting singly on the main valve. The particular operating range of refrigerant pressures is not critical because the bellows 81 always adjusts itself relative to the pilot valve. The space between the constriction 88 and the pilot valve is always very small, so that changes in this distance to establish equilibrium conditions for different pressure ranges are of no significance in the throttling of the main valve 18.

The pilot flow is so small relative to operating flow as to have no effect on the system. When the override closes the main valve completely, there is preferably no flow.

The apparatus may be readily assembled. The overriding control does not require extensive modification of any conventional thermal valve, as it may be, in most cases, added merely as an adjunct to the elements of a thermal valve. It will be seen that stock elements are used to a large extent throughout the apparatus, and a continuous straight line assembly may, in most cases, be employed.

What is claimed is:

1. In a mechanism of the kind described, a housing having an inlet for connection into a fluid line containing fluid under pressure, a main control device to regulate flow through the housing, main control means for moving said device, an abutment device also adapted to move the main control device, a movable wall for moving the abutment device, said movable wall having enclosed pressure chambers on opposite sides thereof, a fluid flow line connected from the inlet into one chamber and connected from the other to exhaust, a port between the chambers and moved with the movable wall, a valve adapted to regulate flow through the port, and automatic means to position the valve, comprising a thermally responsive system containing an expansible fluid, an expansible wall in the system, and connected with the valve for moving the same in response to changes in volume of the expansible fluid.

2. In a mechanism of the kind described, a housing having an inlet for connection into a fluid line containing fluid under pressure, a main control device to regulate flow through the housing, main control means for moving said device, an abutment device also adapted to move the main control device, a movable wall for moving the abutment device, said movable wall having enclosed pressure chambers on opposite sides thereof, a fluid flow line connected from the inlet into one chamber and connected from the other to exhaust, a port between the chambers and moved with the movable wall, a valve adapted to regulate flow through the port, automatic means to position the valve, comprising a flexible wall subjected on one side to the inlet fluid pressure leading to the one pressure chamber, and a thermally responsive system connected into the opposite side of the flexible wall, including a thermally expansible fluid, the thermally responsive system being yieldable to predetermined inlet pressures, acting on the flexible wall in opposition to the pressures of the thermally expansible fluid.

3. In a mechanism of the kind described, a housing having an inlet for connection into a fluid line containing fluid under pressure, a main control device to regulate flow through the housing, main control means for moving said device, an abutment device also adapted to move the main control device, a movable wall for moving the abutment device, said movable wall having enclosed pressure chambers on opposite sides thereof, a fluid flow line connected from the inlet into one chamber and connected from the other to exhaust, a port between the chambers and moved with the movable wall, a valve adapted to regulate flow through the port, automatic means to position the valve, comprising a flexible wall subjected on one side to the inlet fluid pressure leading to the one pressure chamber, a thermally responsive system connected into the opposite side of the flexible wall, including a thermally expansible fluid that remains substantially incompressible throughout its operating range, and a yieldable expansible chamber inserted in said thermal system and yieldingly applying a predetermined pressure to the liquid.

4. In a mechanism of the kind described, a housing having an inlet and an outlet, a thermal valve regulating flow from the inlet to the outlet, temperature-responsive means to open said valve in response to temperature changes, a throttling abutment adapted to engage the valve and move it toward closed position despite the temperature-responsive means, a movable wall for moving the abutment device, said movable wall having pressure chambers on opposite sides thereof, a fluid flow line connected from the inlet into one chamber and connected from the other to the outlet, a port between the chambers and moved with the movable wall, a valve adapted to regulate flow through the port, and automatic means to position the valve.

5. In a mechanism of the kind described, a thermal valve for use in a refrigeration system between a high pressure inlet and a low pressure outlet, a bellows chamber, an operating bellows in said chamber, positioned to operate the thermal valve and dividing the chamber into a high pressure chamber connected to the inlet and a low pressure chamber connected to the outlet, a port between the two chambers and movable with the bellows, a pilot valve disposed near the port to adjust the flow therethrough and modify the pressure difference between the two chambers, a pilot bellows in the high pressure chamber subjected on one side to inlet pressure, means connecting the pilot bellows to the pilot valve to move the same toward the port upon operation of the bellows in response to increase in the pressure in the inlet, a thermal fluid on the opposite side of the bellows, said thermal fluid being adapted to be subjected to the temperatures produced by the refrigeration system, the connections between the pilot bellows and pilot valve being such that when the fluid contracts the pilot valve may move toward closed position, and the operating bellows may be moved by increased pressure differences acting on it, and means connected to the operating bellows to close the thermal valve after movement of the operating bellows as aforesaid, a predetermined amount.

6. A cut-off device including a chamber connected to the high pressure inlet and low pressure outlet of a fluid flow system, an operating bellows in the chamber dividing it into an inlet pressure chamber, and a bellows chamber connected with the outlet, said bellows having a movable head, a port through the head connecting the inlet chamber with the bellows chamber, a valve disposed adjacent said port to regulate flow through the port, said bellows automatically disposing the port relative to the valve to maintain a condition of equilibrium of the bellows, a pilot bellows connected with the inlet to be subjected on one side to inlet pressure and on the other side being connected with a thermally responsive system, said system including a bulb and a thermally expansible liquid, a head moved by the pilot bellows, and leverage means between the pilot bellows head and the pilot valve to move the pilot valve upon movement of the pilot bellows.

7. A cut-off device including a chamber connected to the high pressure inlet and low pressure outlet of a fluid flow system, an operating bellows in the chamber dividing it into an inlet pressure chamber, and a bellows chamber connected with the outlet, said bellows having a movable head, a port through the head connecting the inlet chamber with the bellows chamber, a valve disposed adjacent said port to regulate flow through the port, said bellows automatically disposing the port relative to the valve to maintain a condition of equilibrium of the bellows, a pilot bellows connected with the inlet to be subjected on one side to inlet pressure and on the other side being connected with a thermally responsive system, said system including a bulb and a thermally expansible liquid, a head moved by the pilot bellows, and leverage means between the pilot bellows head and the pilot valve to move the pilot valve upon movement of the pilot bellows, said leverage being adapted to move the pilot valve toward the port upon decrease in the volume of the thermal liquid.

8. In a mechanism of the kind described, for use in a refrigeration system, including a housing having an inlet, and an outlet, a thermal valve between the inlet and the outlet, means to position the valve to maintain constant superheat, including temperature-responsive actuating means to move the valve and means responsive to pressures on the outlet side of the valve to move the valve oppositely to the temperature-responsive means, and combined pressure and temperature-responsive means to move the valve toward closed position in response either to excessive inlet pressure or to excessive delivery of refrigerant, said combined means comprising a power unit adapted to be moved by the difference between pressures from the inlet and outlet of the main valve, and a pilot control for effecting adjustment of the pressure difference of the power unit.

9. In combination with an expansion valve including a housing, a fluid passage therethrough, an inlet and an outlet connected thereto, a thermal valve and seat controlling flow through the passage, and means for opening and closing the thermal valve, of overriding mechanism for throttling or closing said thermal valve regardless of the demands of its opening and closing means including a movable wall, inner and outer chambers separated by said wall, said outer chamber being in communication with said inlet, said inner chamber being in communication with said outlet, a member supported by said wall in position for engagement with said thermal valve adapted to close said thermal valve upon extreme movement of said wall in one direction, a port through said wall communicating said inner and outer chambers, a pilot valve supported in position for movement into controlling position in respect to said port, pressure actuated means for moving said pilot valve operative upon excessive pressure in the inlet, and a thermally responsive system for initiating movement of said pilot valve operative upon excessive low temperature occurrence at a predetermined point.

10. In combination with an expansion valve including a housing, a fluid passage therethrough, an inlet and an outlet connected thereto, a thermal valve and seat controlling flow through the passage, and means for opening and closing the thermal valve, for overriding mechanism for throttling or closing said thermal valve regardless of the demands of its opening and closing means including a movable wall, inner and outer chambers separated by said wall, said outer chamber being in communication with said inlet, said inner chamber being in communication with said outlet, a member supported by said wall in position for engagement with said thermal valve adapted to close said thermal valve upon extreme movement of said wall in one direction, a port through said wall communicating said inner and outer chambers, a pilot valve supported in position for movement into controlling position in respect to said port, pressure-actuated means for moving said pilot valve operative upon excessive pressure in the inlet, and a thermally responsive system for initiating movement of said pilot valve operative upon excessive low temperature occurrence at a predetermined point, said pressure-actuated means and said thermally responsive system including in common a bellows subjected internally to the pressure in the inlet of the expansion valve and being externally contacted by fluid in the thermally responsive system.

11. A cut-off device including a chamber connected to the high pressure inlet and low pressure outlet of a fluid flow system, an operating bellows in the chamber dividing it into an inlet pressure chamber, and a bellows chamber connected with the outlet, said bellows having a movable head, a port through the head connecting the inlet chamber with the bellows chamber, a valve disposed adjacent said port to regulate flow through the port, said bellows automatically disposing the port relative to the valve to maintain a condition of equilibrium of the bellows, a pilot bellows subjected on one side to inlet pressure and on the other side side being connected with a thermally responsive system, said system including a bulb and a thermally expansible liquid, a head moved by the pilot bellows, and leverage means between the pilot bellows head and the pilot valve to move the pilot valve upon movement of the pilot bellows, said leverage being adapted to move the pilot valve toward the port upon decrease in the volume of the thermal liquid, said thermally responsive system also including movable means operative to permit displacement of fluid upon excessive inlet pressure being applied to the pilot bellows.

12. In a valve, a valve housing having an inlet and an outlet, a main valve movable to control flow between the inlet and the outlet, valve operating means for operating the valve including a chamber subjected to inlet pressure, a pair of movable wall devices in said chamber, each having a movable wall subjected on one side to inlet side pressure in the chamber, restricted means connecting the other side of the first of said walls to the outlet side of the valve housing, a port at least as large as the restricted means connecting the opposite sides of said first wall and movable therewith, a pilot valve operated by the second movable wall toward and from said port, the other side of the second movable wall having connection to a source of yieldable control pressure.

13. In a valve, a valve housing having an inlet and an outlet, a main valve movable to control flow between the inlet and the outlet, valve operating means for operating the valve including a chamber subjected to inlet pressure, a pair of movable wall devices in said chamber, each having a movable wall subjected on one side to inlet side pressure in the chamber, restricted means connecting the other side of the first of said walls to the outlet side of the valve housing, a port at least as large as the restricted means connecting the opposite sides of said first wall and movable therewith, a pilot valve operated by the second movable wall toward and from said port, the other side of the second movable wall having connection to a source of yieldable control pressure, the two movable walls being opposite one another, and oppositely movable in response to changes in inlet pressure so that they approach each other upon fall of such pressure and separate from each other upon rise of such pressure.

14. In a valve, a valve housing having an inlet and an outlet, a main valve movable to control flow between the inlet and the outlet, valve operating means for operating the valve including a chamber subjected to inlet pressure, a pair of movable wall devices in said chamber, each having a movable wall subjected on one side to inlet side pressure in the chamber, restricted means connecting the other side of the first of said walls to the outlet side of the valve housing, a port at least as large as the restricted means connecting the opposite sides of said first wall and movable therewith, a pilot valve operated by the second movable wall toward and from said port, the other side of the second movable wall having connection to a source of yieldable control pressure, the two movable walls being opposite one another, and oppositely movable in response to changes in inlet pressure so that they approach each other upon fall of such pressure and separate from each other upon rise of such pressure, and the pilot valve being mounted between the two walls for movement in their common line of movement, the pilot valve being mounted for movement independently of the second wall, and connections between said wall and the valve to move the valve in the direction opposite the direction of movement of the second wall.

15. In a valve, a valve housing having an inlet and an outlet, a main valve movable to control flow between the inlet and the outlet, valve operating means for operating the valve including a chamber subjected to inlet pressure, a pair of movable wall devices in said chamber, each having a movable wall subjected on one side to inlet side pressure in the chamber, restricted means connecting the other side of the first of said walls to the outlet side of the valve housing, a port at least as large as the restricted means connecting the opposite sides of said first wall and movable therewith, a pilot valve operated by the second movable wall toward and from said port, the other side of the second movable wall having connection to a source of yieldable control pressure, the two movable walls being opposite one another, and oppositely movable in response to changes in inlet pressure so that they approach each other upon fall of such pressure and separate from each other upon rise of such pressure, the pilot valve being mounted between the two valves for movement independently of them, yieldable means urging the valve in one direction, lever means rockably engaging the valve and having a fixed fulcrum, and force applying means connecting the lever means and the second wall.

16. In a valve, a valve housing having an inlet and an outlet, a main valve movable to control flow between the inlet and the outlet, valve operating means for operating the valve including a chamber subjected to inlet pressure, a pair of movable wall devices in said chamber, each having a movable wall subjected on one side to inlet side pressure in the chamber, restricted means connecting the other side of the first of said walls to the outlet side of the valve housing, a port at least as large as the restricted means connecting the opposite sides of said first wall and movable therewith, a pilot valve operated by the second movable wall toward and from said port, the other side of the second movable wall having connection to a source of yieldable control pressure, the two movable walls being opposite one another, and oppositely movable in response to changes in inlet pressure so that they approach each other upon fall of such pressure and separate from each other upon rise of such pressure, the pilot valve being mounted between the two valves for movement independently of them, yieldable means urging the valve in one direction, lever means rockably engaging the valve and having a fixed fulcrum, and force applying means connecting the lever means and the second wall, the lever means including a plurality of levers extending outwardly from the valve, and the force applying means including a crosshead moved by the second movable wall, with contact means from the crosshead to each lever.

17. In a valve, a valve housing having an inlet and an outlet, a main valve movable to control flow between the inlet and the outlet, valve operating means for operating the valve including a chamber subjected to inlet pressure, a pair of movable wall devices in said chamber, each having a movable wall subjected on one side to inlet side pressure in the chamber, restricted means connecting the other side of the first of said walls to the outlet side of the valve housing, a port at least as large as the restricted means connecting the opposite sides of said first wall and movable therewith, a pilot valve operated by the second movable wall toward and from said port, the other side of the second movable wall having connection to a source of yieldable control pressure, the two movable walls being opposite one another, and oppositely movable in response to changes in inlet pressure so that they approach each other upon fall of such pressure and separate from each other upon rise of such pressure, the source of yieldable control pressure including a closed liquid system containing a thermal liquid, an expansion chamber in the system, and yieldable means applying a predetermined pressure to the expansion chamber and hence to the liquid, whereby when inlet pressure exceeds the liquid pressure fixed by the yieldable means, the second movable wall may be moved in opposition to the normal pressure of the thermal liquid.

JOHN E. DUBE.
FRANKLIN M. MacDOUGALL.
GEORGE D. BOWER.

REFERENCES CITED

The following references are of record in the file of this patent:

UNITED STATES PATENTS

| Number | Name | Date |
| --- | --- | --- |
| 1,925,301 | Campbell | Sept. 5, 1933 |
| 2,029,203 | Soderberg | Jan. 28, 1936 |
| 2,111,230 | Toussaint | Mar. 15, 1938 |
| 2,116,802 | Shivers | May 10, 1938 |
| 2,319,993 | Kaufman | May 25, 1943 |
| 2,404,596 | Roche | July 23, 1946 |
| 2,443,581 | Lange | June 15, 1948 |

FOREIGN PATENTS

| Number | Country | Date |
| --- | --- | --- |
| 463,313 | Great Britain | Mar. 19, 1937 |